US010992763B2

(12) United States Patent
Kursun et al.

(10) Patent No.: US 10,992,763 B2
(45) Date of Patent: Apr. 27, 2021

(54) DYNAMIC INTERACTION OPTIMIZATION AND CROSS CHANNEL PROFILE DETERMINATION THROUGH ONLINE MACHINE LEARNING

(71) Applicant: BANK OF AMERICA CORPORATION, Charlotte, NC (US)

(72) Inventors: Eren Kursun, New York, NY (US); Dharmender Kumar Satija, Rye Brook, NY (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 305 days.

(21) Appl. No.: 16/107,072

(22) Filed: Aug. 21, 2018

(65) Prior Publication Data

US 2020/0068031 A1 Feb. 27, 2020

(51) Int. Cl.
*H04L 29/08* (2006.01)
*G06N 3/08* (2006.01)
*H04W 12/10* (2021.01)
*H04W 24/08* (2009.01)
*H04W 12/12* (2021.01)
*H04W 72/02* (2009.01)

(52) U.S. Cl.
CPC ............... *H04L 67/22* (2013.01); *G06N 3/08* (2013.01); *H04W 12/10* (2013.01); *H04W 12/12* (2013.01); *H04W 24/08* (2013.01); *H04W 72/02* (2013.01)

(58) Field of Classification Search
CPC . H04L 67/22; H04L 63/1408; H04L 63/1433; H04L 67/306; G06N 3/08; H04W 12/10; H04W 24/08; H04W 12/12; H04W 72/02; H04W 24/02
See application file for complete search history.

(56) References Cited

U.S. PATENT DOCUMENTS

| | | |
|---|---|---|
| 5,121,467 A | 6/1992 | Skeirik |
| 5,212,765 A | 5/1993 | Skeirik |
| 5,282,261 A | 1/1994 | Skeirik |
| 5,822,741 A | 10/1998 | Fischthal |
| 6,047,277 A | 4/2000 | Parry et al. |
| 6,067,535 A | 5/2000 | Hobson et al. |
| 6,304,864 B1 | 10/2001 | Liddy et al. |
| 6,324,532 B1 | 11/2001 | Spence et al. |
| 7,089,592 B2 | 8/2006 | Adjaoute |
| 8,504,361 B2 | 8/2013 | Collobert et al. |

(Continued)

*Primary Examiner* — Nicholas R Taylor
*Assistant Examiner* — Tania M Pena-Santana
(74) *Attorney, Agent, or Firm* — Michael A. Springs; Moore & Van Allen PLLC; R. W. McCord Rayburn

(57) ABSTRACT

A system and method for dynamically optimizing channel interactions and account security are provided. A controller configured for analyzing user interactions is configured to determine an interaction pattern of a user during an interaction with the user over a communication channel; calculate a weighted confidence function for subsequent interactions with the user based on the determined interaction pattern, wherein the weighted confidence function defines authentication and response procedures for the subsequent interactions with the user; and merge the weighted confidence function into a custom user profile for the user across a plurality of communication channels, wherein the user profile maps account vulnerabilities based on the weighted confidence function.

20 Claims, 6 Drawing Sheets

(56) References Cited

U.S. PATENT DOCUMENTS

| | | | |
|---|---|---|---|
| 9,336,268 B1 | 5/2016 | Moudy et al. | |
| 9,516,035 B1* | 12/2016 | Moritz | H04L 63/0861 |
| 9,653,093 B1 | 5/2017 | Matsoukas et al. | |
| 9,659,248 B1 | 5/2017 | Barbosa et al. | |
| 10,237,298 B1* | 3/2019 | Nguyen | H04L 63/10 |
| 2005/0102251 A1 | 5/2005 | Gillespie | |
| 2006/0184483 A1 | 8/2006 | Clark et al. | |
| 2007/0100773 A1* | 5/2007 | Wallach | G06Q 30/06 705/75 |
| 2008/0109392 A1* | 5/2008 | Nandy | G06N 5/02 706/47 |
| 2011/0238510 A1 | 9/2011 | Rowen et al. | |
| 2012/0265596 A1 | 10/2012 | Mazed et al. | |
| 2012/0317058 A1 | 12/2012 | Abhulimen | |
| 2014/0122325 A1* | 5/2014 | Zoldi | G06Q 20/4016 705/39 |
| 2015/0033341 A1 | 1/2015 | Schmidtler et al. | |
| 2015/0095017 A1 | 4/2015 | Mnih et al. | |
| 2016/0140567 A1* | 5/2016 | Hanna | G06Q 20/40145 705/44 |
| 2018/0157643 A1 | 6/2018 | Andrassy et al. | |

\* cited by examiner

DYNAMIC INTERACTION OPTIMIZATION AND CROSS CHANNEL PROFILE DETERMINATION THROUGH ONLINE MACHINE LEARNING

BACKGROUND

A user interaction optimization system is provided that extracts complex patterns from cross channel interaction data through machine learning to learn user interaction patterns, improve security, prevent unauthorized access, and optimize the subsequent user interactions.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address these and/or other needs by providing an innovative system, method and computer program product for interaction monitoring and optimization for increased account security. In one embodiment, a system for dynamically optimizing channel interactions is provided. The system comprises a neural network learning engine and a controller configured for analyzing user interactions. The controller comprising at least one memory device with computer-readable program code stored thereon, at least one communication device connected to a network, and at least one processing device, wherein the at least one processing device is configured to execute the computer-readable program code to: input historical and streaming user interaction data from across a plurality of communication channels into the neural network learning engine; determine one or more neural network-derived user interaction patterns from across the plurality of communication channels, wherein the one or more neural network-derived interaction patterns are associated with authorized user activity; and build a unified user profile from the one or more neural network-derived user interaction patterns. The unified user profile comprises a channel profile component, a natural language processing profile component, a resource usage profile component, an interaction history profile component, and a user knowledge content profile component.

In one embodiment, the system continuously updates the unified user profile based on subsequent interactions input into the neural network learning engine In another embodiment, the system calculates confidence levels for the historical and streaming user interaction data from across the plurality of communication channels based on the one or more neural network-derived user interaction patterns, wherein the confidence levels quantify a reliability of the historical and streaming user interaction data and the plurality of communication channels.

In yet another embodiment, the system further includes an unauthorized access reference database comprising known unauthorized user profiles and strategies, and the system is configured to generate a threat assessment map based on the one or more neural-network derived user interaction patterns and the unauthorized access reference database, wherein the threat assessment map defines security vulnerabilities of the user profile. In yet another embodiment, the system is configured to input the threat assessment map into the neural network learning engine to determine the neural network-derived user interaction patterns. In yet another embodiment, the system is configured to disable an authentication mechanism or an account action for subsequent interactions based on the user profile.

In yet another embodiment, the system further includes a natural language processing module, wherein the one or more neural network-derived user interaction patterns comprise a communication pattern of the user. The system is further configured to establish a signature marker of the user based on the communication pattern; and store the signature marker in the unified user profile, wherein the marker is used to at least partially identify and authenticate the user in subsequent interactions. In yet another embodiment, the signature marker comprises at least one of vocabulary, word frequency patterns, syntax, grammar, misspellings, abbreviations, pronunciation, intonation, timbre, pitch, cadence, language, and dialect.

In yet another embodiment, the system is further configured to identify one or more inconsistencies received in the historical and streaming user interaction data based on the one or more neural network-derived user interaction patterns of the unified user profile; and consolidate the one or more inconsistencies within the unified user profile. In yet another embodiment, the one or more inconsistencies comprise a user error or failure to perform an action. In yet another embodiment, the one or more inconsistencies are associated with unauthorized user access, and wherein the one or more inconsistencies are consolidated as security vulnerabilities of the user profile.

A system for dynamic threat assessment across a plurality of communication channels is also provided. the system comprises a controller configured for analyzing user interactions, the controller comprising at least one memory device with computer-readable program code stored thereon, at least one communication device connected to a network, and at least one processing device, wherein the at least one processing device is configured to execute the computer-readable program code to: receive historical and streaming user interaction data from across a plurality of data sources; determine one or more user interaction patterns from the historical and streaming user interaction data, wherein the one or more interaction patterns are associated with authorized user activity; and calculate a confidence level for each of the data sources from across the plurality of data sources based on the one or more user interaction patterns, wherein the confidence levels quantify a reliability of the data sources. The data sources include a channel component, a natural language processing component, a resource usage component, an interaction history component, and a user knowledge content component of a unified user profile generated by merging the historical and streaming user interaction data from across the plurality of communication channels. In one embodiment, the system further comprising a neural network learning engine configured to continuously update the unified user profile based on subsequent user interactions, wherein the confidence level is recalculated for each of the plurality of data sources.

In yet another embodiment, the system further comprises an unauthorized access reference database comprising known unauthorized user profiles and strategies, wherein the system is further configured to generate a threat assessment map based on the one or more user interaction patterns and the unauthorized access reference database, wherein the threat assessment map defines security vulnerabilities of the unified user profile. In yet another embodiment, the system is further configured to disable an authentication mechanism or an account action for subsequent interactions based on the security vulnerabilities defined by the threat assessment map. In yet another embodiment, the system is further configured to transmit a preventative alert to the user based on the security vulnerabilities defined by the threat assessment map.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
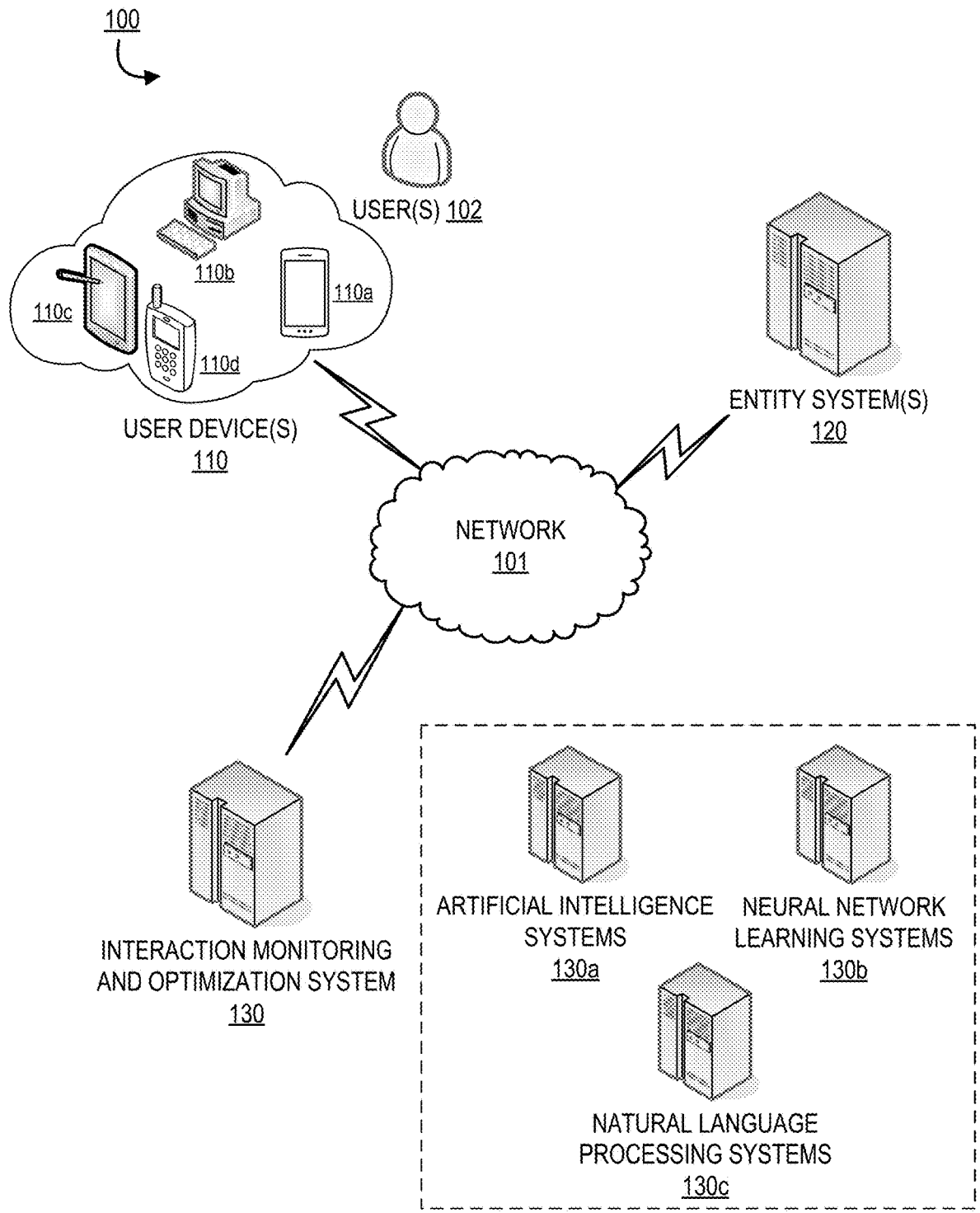
Figure 2:
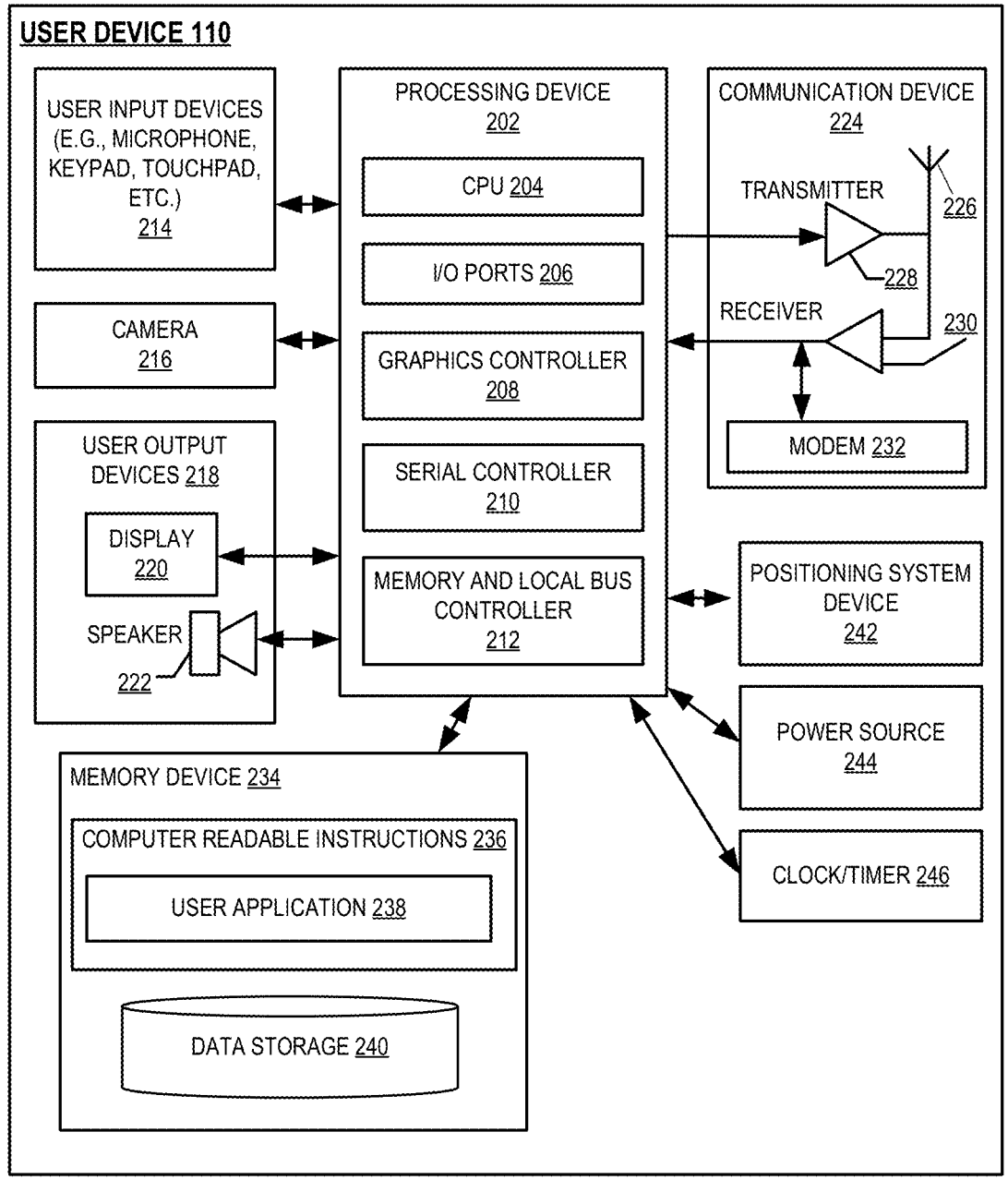
Figure 3:
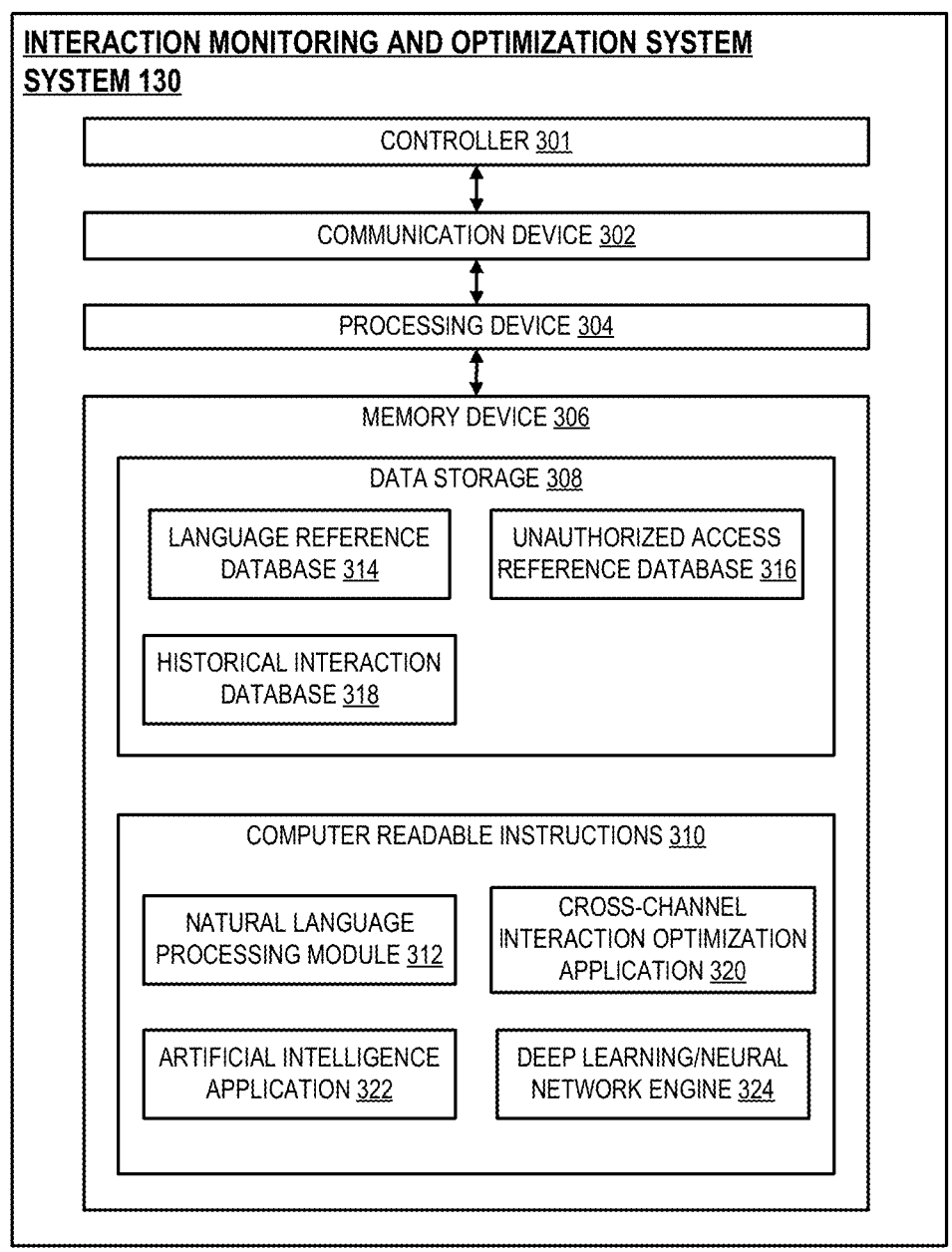
Figure 4A:
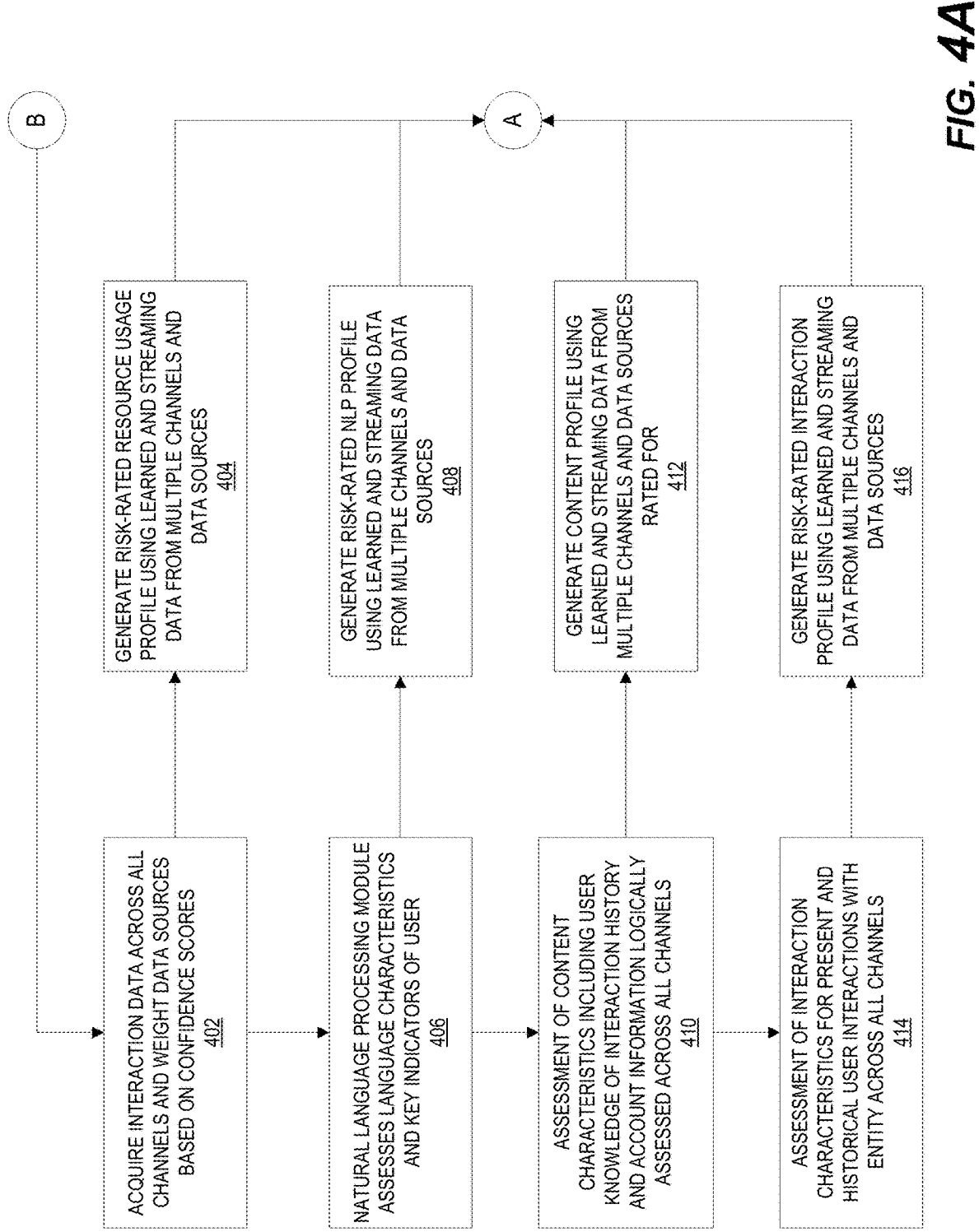
Figure 4B:
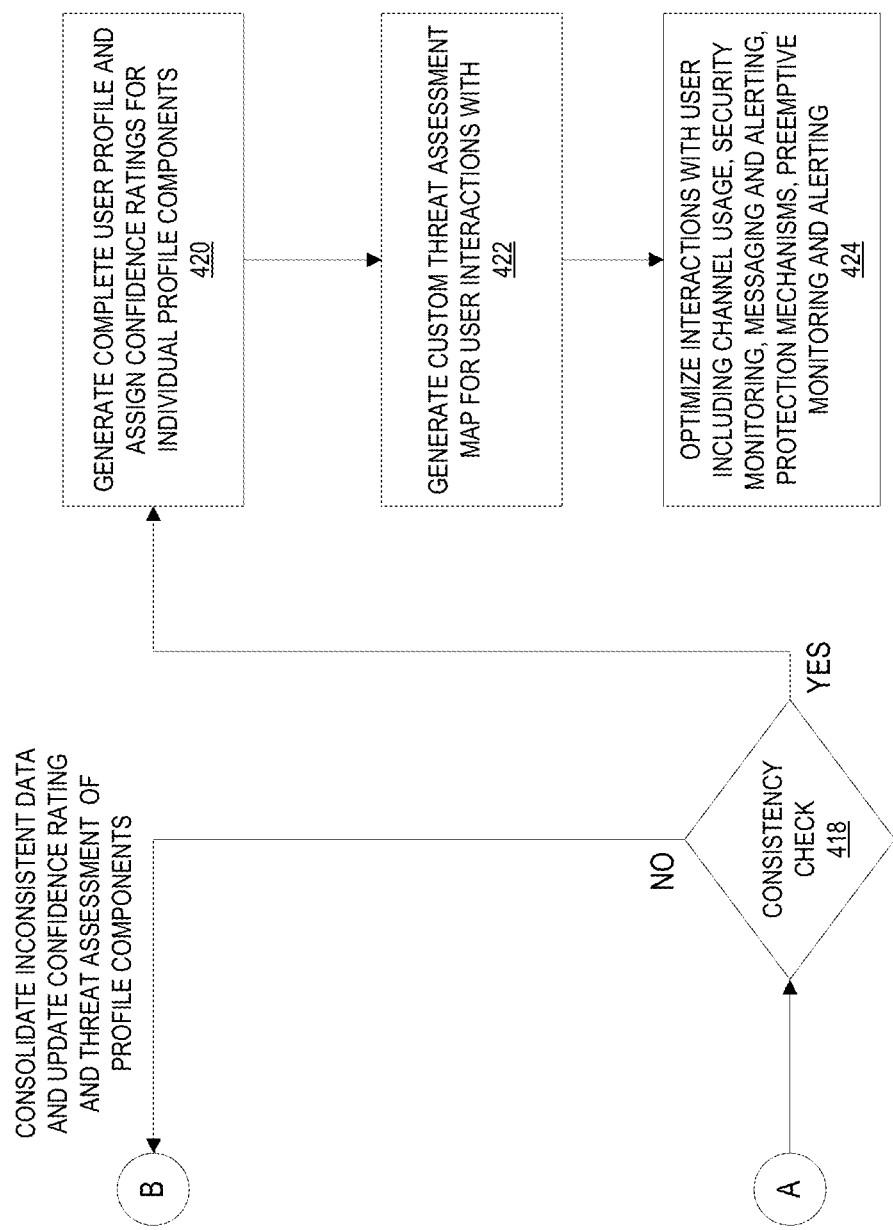
Figure 5:
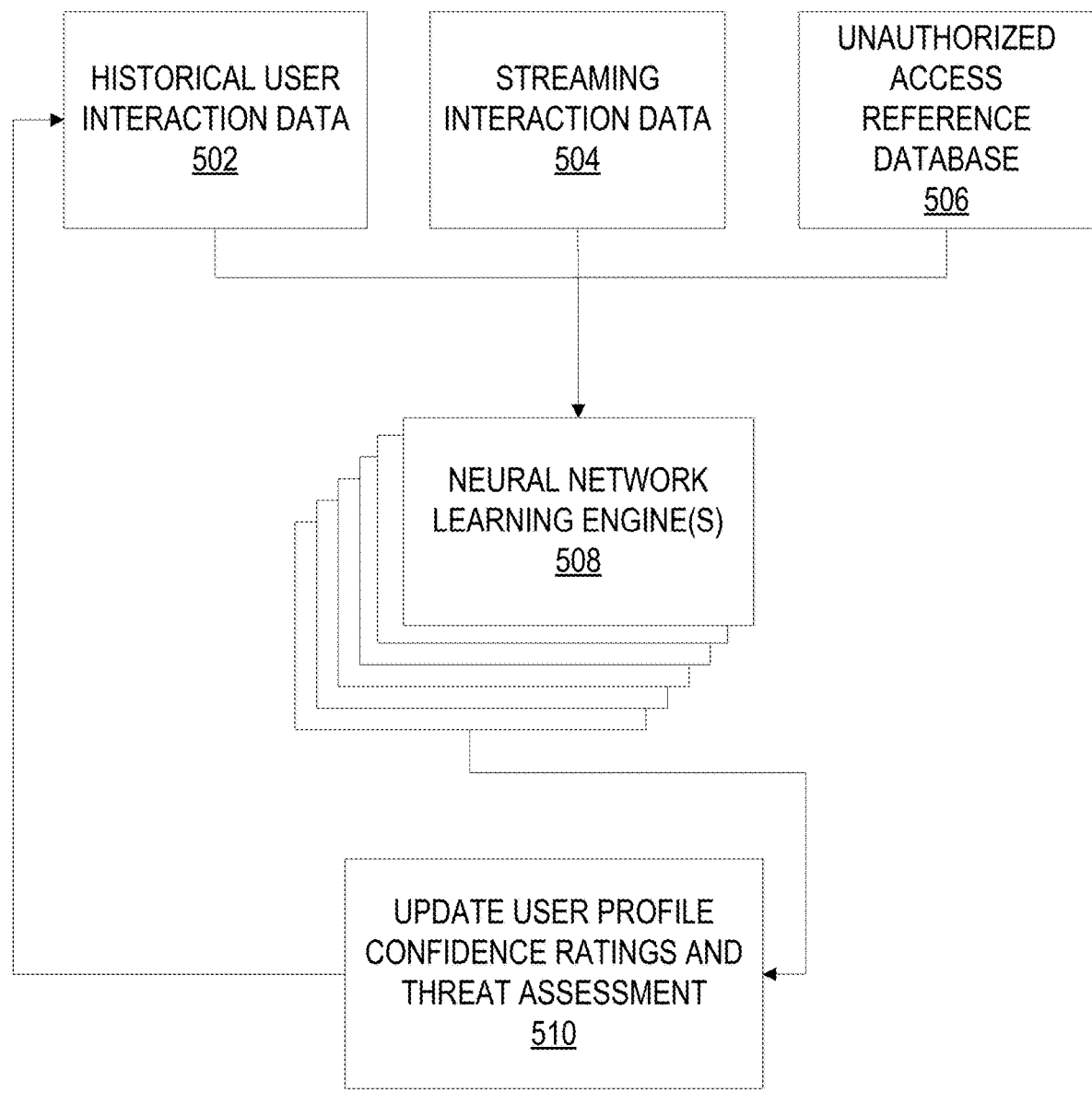

Having thus described embodiments of the invention in general terms, reference will now be made to the accompanying drawings, wherein:

FIG. 1 provides an interaction monitoring and optimization system environment, in accordance with one embodiment of the invention;

FIG. 2 provides a block diagram of a user device, in accordance with one embodiment of the invention;

FIG. 3 provides a block diagram of an interaction monitoring system, in accordance with one embodiment of the invention;

FIG. 4A provides a high level process map for interaction monitoring and user profile generation, in accordance with one embodiment of the invention;

FIG. 4B provides a high level process map for interaction optimization and mapping, in accordance with one embodiment of the invention; and FIG. 5 provides a high level process map for user interaction optimization using a neural network engine, in accordance with one embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

As used herein the term "user device" may refer to any device that employs a processor and memory and can perform computing functions, such as a personal computer or a mobile device, wherein a mobile device is any mobile communication device, such as a cellular telecommunications device (i.e., a cell phone or mobile phone), a mobile Internet accessing device, or other mobile device. Other types of mobile devices may include portable digital assistants (PDAs), pagers, wearable devices, mobile televisions, gaming devices, laptop computers, cameras, video recorders, audio/video player, radio, global positioning system (GPS) devices, or any combination of the aforementioned. The device may be used by the user to access the system directly or through an application, online portal, internet browser, virtual private network, or other connection channel.

As used herein, the term "computing resource" may refer to elements of one or more computing devices, networks, or the like available to be used in the execution of tasks or processes. A computing resource may be used to refer to available processing, memory, and/or network bandwidth and/or power of an individual computing device as well a plurality of computing devices that may operate as a collective for the execution of one or more tasks (e.g., one or more computing devices operating in unison).

As used herein, the term "user" may refer to any entity or individual associated with the interaction monitoring and optimization system. In some embodiments, a user may be a computing device user, a phone user, a mobile device application user, a customer of an entity or business, a financial institution customer (e.g., an account holder or a person who has an account (e.g., banking account, credit account, or the like)), a system operator, a customer service representative, and/or employee of an entity. In a specific embodiment, a user may be a customer accessing a user account via an associated user device. In some embodiments, identities of an individual may include online handles, usernames, identification numbers (e.g., Internet protocol (IP) addresses), aliases, family names, maiden names, nicknames, or the like. In some embodiments, the user may be an individual or an organization (i.e., a charity, business, company, governing body, or the like).

As used herein, the term "entity" may be used to include any organization or collection of users that may interact with the interaction monitoring and optimization system. An entity may refer to a business, company, or other organization that either maintains or operates the system or requests use and accesses the system. The terms "financial institution" and "financial entity" may be used to include any organization that processes financial transactions including, but not limited to, banks, credit unions, savings and loan associations, investment companies, stock brokerages, resource management firms, insurance companies and the like. In specific embodiments of the invention, use of the term "bank" is limited to a financial entity in which account-bearing customers conduct financial transactions, such as account deposits, withdrawals, transfers and the like. In other embodiments, an entity may be a business, organization, a government organization or the like that is not a financial institution.

As used herein, "authentication information" may refer to any information that can be used to identify a user. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device. This authentication information may be used to at least partially authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. User authentication by alternative or supplementary means such as natural language processing and analysis of user interaction patterns is discussed herein.

To "monitor" is to watch, observe, or check something for a special purpose over a period of time. The "monitoring" may occur periodically over the period of time, or the monitoring may occur continuously over the period of time. In some embodiments, a system may actively monitor a data source, database, or data archive, wherein the system reaches out to the database and watches, observes, or checks the database for changes, updates, and the like. In other embodiments, a system may passively monitor a database, wherein the database provides information to the system and the system then watches, observes, or checks the provided information. In some embodiments a system, application, and/or module (such as the interaction monitoring system described herein) may monitor a user input in the system. In further embodiments, the system may store said user input during an interaction in order to generate a user interaction profile that characterizes regular, common, or repeated interactions of the user with the system.

As used herein, an "interaction" may refer to any action or communication between one or more users, one or more entities or institutions, and/or one or more devices or systems within the system environment described herein. For example, an interaction may refer to a user interaction with a system or device, wherein the user interacts with the system or device in a particular way. An interaction may include user interactions with a user interface (e.g., clicking, swiping, text or data entry, etc.), authentication actions (e.g., signing-in, username and password entry, PIN entry, etc.), account actions (e.g., account access, fund transfers, etc.) and the like. In another example, an interaction may refer to a user communication via one or more channels (i.e., phone, email, text, instant messaging, brick-and-mortar interaction, and the like) with an entity and/or entity system to complete an operation or perform an action with an account associated with user and/or the entity. In some embodiments, as discussed herein, a user interaction may include a user communication which may be analyzed using natural language processing techniques or the like.

Natural language processing (NLP) systems leverage artificial intelligence, machine-learning, neural networks, and/or other complex, specific-use computer systems to analyze and translate human language in order to adapt it for efficient processing by computer systems thereby allowing for enhanced communication and understanding by the systems. NLP is especially beneficial in large scale operations (e.g., customer-facing interfaces, automated customer support channels) that receive substantial amounts of unstructured data in the form of text and voice communications from human users, as NLP can receive, interpret, and structure the communications in order to be made directly compatible with other computer systems. For example, NLP systems may be configured to not only receive, process, and recognize various languages and dialects, but also identify grammar, syntax or sentence structure, vocabulary, misspellings, abbreviations, word frequency patterns, slang, colloquialisms, pronunciations, vocal intonations, timbre, pitch, cadence and other similar language qualities.

Embodiments of the system, as described herein, are configured to receive user input during a user interactions over a plurality of communication channels (e.g., phone, website, mobile application, brick-and-mortar location) and generate a unified user profile that provides a holistic view of the user's interaction history, knowledge patterns, and language markers and characteristics (i.e., via NLP). In this way, the system may reference the observed interaction and/or communication patterns of the user stored in the profile to optimize subsequent user interactions with an entity and make the interactions more efficient (i.e., requiring less time and therefore fewer entity resources (i.e., computing and/or human)). By continuously optimizing subsequent interactions, the system, as described herein, may provide an improved user interface based on previous interactions. In some embodiments, the system monitors and dynamically updates a user profile components in real-time based on additional user interactions. In this way, the system may continue to create a more accurate baseline of the authorized user interactions, wherein unauthorized user access may be easily identified and prevented. By optimizing future interactions based on the user profile, interactions with the user may be made more efficient, wherein interaction time may be reduced and a required amount of computing and/or human resources needed to perform the interaction and associated user actions may be reduced.

Furthermore, the system leverages deep learning neural networks and artificial intelligence to identify and analyze complex patterns across communication channels and different components of the user profile (e.g., interaction history, user knowledge, NLP) over time in order to accurately and confidently identify an authorized user.

The system may employ this complex analysis to identify occurrences of unauthorized access to a user account by determining abnormal interaction patterns that deviate from the analyzed behavior of the actual user. Furthermore, the system generates a custom risk map for the actual user based on the analysis that incorporates known unauthorized users and strategies to preemptively flag any account vulnerabilities. In this way, unauthorized access may be preemptively identified and blocked before losses occur even in cases where complex misappropriation technology is employed by unauthorized users in an attempt to mimic an actual, authorized user (i.e., pass the Turing test). The invention provides a technical solution to the problem of AI-executed account security by utilizing specific-purpose computing devices (e.g., neural networks) in non-conventional, non-obvious ways (i.e., user profile analysis and complex patterning). Furthermore, account security may be increased by identifying unauthorized user access when compared to the baseline of authorized user activity provided by the user profile as well as identified potential vulnerabilities.

FIG. 1 provides an interaction monitoring and optimization system environment, in accordance with one embodiment of the invention. As illustrated in FIG. 1, the interaction monitoring and optimization system 130 is operatively coupled, via a network 101, to the user device(s) 110 (e.g., a plurality of user devices 110*a*-110*d*) and the entity system 120. In this way, the interaction monitoring and optimization system 130 can send information to and receive information from the user device 110 and the entity system 120. In the illustrated embodiment, the plurality of user devices 110*a*-110*d* provide a plurality of communication channels through which the entity system 120 and/or the interaction monitoring and optimization system 130 may communicate with the user 102 over the network 101.

In the illustrated embodiment, the interaction monitoring and optimization system 130 further comprises an artificial intelligence (AI) system 130*a*, a neural network learning system 130*b*, and a natural language processing system 130*c* which may be separate systems operating together with the interaction monitoring and optimization system 130 or integrated within the interaction monitoring and optimization system 130.

FIG. 1 illustrates only one example of an embodiment of the system environment 100, and it will be appreciated that in other embodiments, one or more of the systems, devices, or servers may be combined into a single system, device, or server, or be made up of multiple systems, devices, or servers. It should be understood that the servers, systems, and devices described herein illustrate one embodiment of the invention. It is further understood that one or more of the servers, systems, and devices can be combined in other embodiments and still function in the same or similar way as the embodiments described herein.

The network 101 may be a system specific distributive network receiving and distributing specific network feeds and identifying specific network associated triggers. The network 101 may also be a global area network (GAN), such as the Internet, a wide area network (WAN), a local area network (LAN), or any other type of network or combination of networks. The network 101 may provide for wireline, wireless, or a combination wireline and wireless communication between devices on the network 101.

In some embodiments, the user 102 is an individual interacting with the entity system 120 via a user device 110 while being monitored by the interaction monitoring system 130 over the network 101. In some embodiments a user 102 is a user requesting service from the entity (e.g., customer service) or interacting with an account maintained by the entity system 120. In an alternative embodiment, the user 102 is an unauthorized user attempting to gain access to a user account of an actual, authorized user.

FIG. 2 provides a block diagram of a user device 110, in accordance with one embodiment of the invention. The user device 110 may generally include a processing device or processor 202 communicably coupled to devices such as, a memory device 234, user output devices 218 (for example, a user display device 220, or a speaker 222), user input devices 214 (such as a microphone, keypad, touchpad, touch screen, and the like), a communication device or network interface device 224, a power source 244, a clock or other timer 246, a visual capture device such as a camera 216, a positioning system device 242, such as a geo-positioning system device like a GPS device, an accelerometer, and the like, one or more chips, and the like. The processing device 202 may further include a central processing unit 204, input/output (I/O) port controllers 206, a graphics controller or GPU 208, a serial bus controller 210 and a memory and local bus controller 212.

The processing device 202 may include functionality to operate one or more software programs or applications, which may be stored in the memory device 234. For example, the processing device 202 may be capable of operating applications such as the user application 238. The user application 238 may then allow the user device 110 to transmit and receive data and instructions from the other devices and systems. The user device 110 comprises computer-readable instructions 236 and data storage 240 stored in the memory device 234, which in one embodiment includes the computer-readable instructions 236 of a user application 238. In some embodiments, the user application 238 allows a user 102 to access and/or interact with other systems such as the entity system 120. In some embodiments, the user is a customer of a financial entity and the user application 238 is an online banking application providing access to the financial entity system 120 wherein the user may interact with a user account via a user interface of the user application 238.

The processing device 202 may be configured to use the communication device 224 to communicate with one or more other devices on a network 101 such as, but not limited to the entity system 120 and the data transformation system 130. In this regard, the communication device 224 may include an antenna 226 operatively coupled to a transmitter 228 and a receiver 230 (together a "transceiver"), modem 232. The processing device 202 may be configured to provide signals to and receive signals from the transmitter 228 and receiver 230, respectively. The signals may include signaling information in accordance with the air interface standard of the applicable BLE standard, cellular system of the wireless telephone network and the like, that may be part of the network 201. In this regard, the user device 110 may be configured to operate with one or more air interface standards, communication protocols, modulation types, and access types. By way of illustration, the user device 110 may be configured to operate in accordance with any of a number of first, second, third, and/or fourth-generation communication protocols and/or the like. For example, the user device 110 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The user device 110 may also be configured to operate in accordance with non-cellular communication mechanisms, such as via a wireless local area network (WLAN) or other communication/data networks. The user device 110 may also be configured to operate in accordance Bluetooth® low energy, audio frequency, ultrasound frequency, or other communication/data networks.

The user device 110 may also include a memory buffer, cache memory or temporary memory device operatively coupled to the processing device 202. Typically, one or more applications 238, are loaded into the temporarily memory during use. As used herein, memory may include any computer readable medium configured to store data, code, or other information. The memory device 234 may include volatile memory, such as volatile Random Access Memory (RAM) including a cache area for the temporary storage of data. The memory device 234 may also include non-volatile memory, which can be embedded and/or may be removable. The non-volatile memory may additionally or alternatively include an electrically erasable programmable read-only memory (EEPROM), flash memory or the like.

Though not shown in detail, the system further includes one or more entity systems 120 (as illustrated in FIG. 1) which is connected to the user device 110 and the interaction monitoring and optimization system 130 and which may be associated with one or more entities, institutions or the like. In this way, while only one entity system 120 is illustrated in FIG. 1, it is understood that multiple networked systems may make up the system environment 100. The entity system 120 generally comprises a communication device, a processing device, and a memory device. The entity system 120 comprises computer-readable instructions stored in the memory device, which in one embodiment includes the computer-readable instructions of an entity application. The entity system 120 may communicate with the user device 110 and the interaction monitoring and optimization system 130 to provide access to one or more user accounts stored and maintained on the entity system 120. In some embodiments, the entity system 120 may communicate with the interaction monitoring and optimization system 130 during an interaction with a user 102 in real-time, wherein user interactions may be processed by the interaction monitoring and optimization system 130 in order to characterize the user and generate a user profile.

FIG. 3 provides a block diagram of the interaction monitoring and optimization system 130, in accordance with one embodiment of the invention. The interaction monitoring and optimization system 130 generally comprises a controller 301, a communication device 302, a processing device 304, and a memory device 306.

As used herein, the term "controller" generally refers to a hardware device and/or software program that controls and manages the various systems described herein such as the user device 110, the entity system 120, and the interaction monitoring and optimization system 130, in order to interface and manage data flow between systems while executing commands. In some embodiments, the controller may be integrated into one or more of the systems described herein. In some embodiments, the controller may perform one or more of the processes, actions, or commands described herein.

As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 304 is operatively coupled to the communication device 302 and the memory device 306. The processing device 304 uses the communication device 302 to communicate with the network 101 and other devices on the network 101, such as, but not limited to the user device 110 and the entity system 120. As such, the communication device 302 generally comprises a modem, server, or other device for communicating with other devices on the network 101.

As further illustrated in FIG. 3, the interaction monitoring system 130 comprises computer-readable instructions 310 stored in the memory device 306, which in one embodiment includes the computer-readable instructions 310 of a natural language processing module 312, a cross-channel interaction optimization application 320, an artificial intelligence application 322, and a deep learning/neural network engine 324. The artificial intelligence application 322, deep learning/neural network engine 324, and the natural language processing module 312 may be utilized by the cross-channel interaction optimization application 320 to continuously monitor user interactions while analyzing collected data for complex patterning in order to dynamically update a user profile to provide a holistic view of the user 102 while further generating confidence and vulnerability scoring for communication channels, user profile components, and future interactions.

In some embodiments, the memory device 306 includes data storage 308 for storing data related to the system environment, but not limited to data created and/or used by the natural language processing module 312, cross-channel interaction optimization application 320, an artificial intelligence application 322, and a deep learning/neural network engine 324 such as one or more language reference databases 314, unauthorized access reference database 316, and a historical interaction database 318. In one embodiment, the language reference database 314 is used by the natural language processing module 312 to analyze and store communications received from a user 102. The unauthorized access references database 316 is used to store profiles of known unauthorized users and strategies. The historical interaction database 318 is used to store information regarding past interactions (e.g., account actions, transactions) with the user 102.

In one embodiment of the invention, the cross-channel interaction optimization application 320 may associate with applications having computer-executable program code that instructs the processing device 304 to perform certain functions described herein. In one embodiment, the computer-executable program code of an application associated with the user device 110 and/or the entity system 120 may also instruct the processing device 304 to perform certain logic, data processing, and data storing functions of the application.

Embodiments of the interaction monitoring and optimization system 130 may include multiple systems, servers, computers or the like maintained by one or many entities. In some embodiments, the interaction monitoring and optimization system 130 may be part of the entity system 120. In other embodiments, the entity system 120 is distinct from the interaction monitoring system 130. The interaction monitoring and optimization system 130 may communicate with the entity system 120 via a secure connection generated for secure encrypted communications between the two systems either over the network 101 or alternative to the network 101.

FIG. 4A provides a high level process map for interaction monitoring and user profile generation, in accordance with one embodiment of the invention. Initially, the system generates a user profile based on historical user interaction data (e.g., user identifying information, communication history, transaction history) which provides a holistic view of an authorized user and user interaction patterns while also mapping potential user account vulnerabilities. As described herein, the user profile is continuously updated in real-time as additional user interaction data may be streamed and incorporated into the user profile from multiple data sources (e.g., channels). In some embodiments, interactions performed between the user device(s) 110 and the entity system 120 are intercepted and monitored by the interaction monitoring and optimization system 130, wherein user interaction data may be extracted from an interaction over the network 101 by the interaction monitoring system 130 in order to populate the user profile. The user profile generally comprises a cross-channel data collection profile component, a user resource usage profile component, a NLP profile component, a content profile component, and an interaction profile component.

As illustrated in blocks 402, the system initially acquires user interaction data from across all communication channels of the entity and generates the channel profile component of the user profile. The channel profile component includes information associated with communication channels used and not used by the user for interactions. In some embodiments, communication channels may include phone lines, text messaging systems, email, applications (e.g., mobile applications), websites, ATMs, card readers, call centers, electronic assistants, instant messaging systems, interactive voice response (IVR) systems, brick-and-mortar locations and the like. In some embodiments, the channel profile may include user-preferred or user-frequented channels which a user is most likely to use to communicate with the entity. For example, a user may access an account via a mobile banking application a majority of the times or a predetermined amount of times during past interactions, wherein the mobile banking application may be identified as a user-preferred communication channel.

As illustrated in block 404, the system extracts resource usage data (i.e., transaction data) from the collected interaction data across all channels to generate a resource usage profile component of the user profile. The resource usage profile component may include information regarding a past, current, or schedule transactions associated with the user. Transaction information may include transaction amounts, payor and/or payee information, transaction dates and times, transaction locations, transaction frequencies, and the like. In some embodiments, the interaction characteristics may include information regarding account usage. For example, the interaction characteristics may include information regarding usage of a credit or debit card account such as locations or time periods where the card was used. In another example, the interaction characteristics may include merchants with whom the user frequently interacts.

As illustrated in blocks 406 and 408, the system collects natural language processing data to generate a NLP profile component of the user profile. NLP data may include, but is not limited to, identified languages, dialects, grammar, syntax or sentence structure (i.e., construction, length, complexity, etc.), vocabulary, misspellings, abbreviations, word frequency patterns, slang, colloquialisms, pronunciations, vocal intonations, timbre, pitch, cadence and other similar language qualities. NLP data may further include cognitive markers (i.e., patterns in cognition and information delivery and receipt) and other signature markers such as mistakes or failures to perform a task (e.g., provide a password or piece of information for authentication). NLP data may be collected across multiple communication channels including voice (e.g., via voice recognition technology), video, brick-and-mortar, and text-based channels while leveraging machine learning to generate a complete natural language profile for the user. For example, the system may collect NLP data during a user interaction with a customer support call center via a phone line, wherein the NLP system or module may be configured to extract vocal or articulated identifiers characteristic of the user in order to generate the NLP profile component of the user profile.

The natural language profile may be used to accurately identify and authenticate the user based on one or more unique or distinguishing identifiers or characteristic key indicators articulated by the user in text and/or speech. Similarly, unauthorized users may be detected if an unauthorized user's communications are not consistent with the natural language profile of the authorized user. For example, the system may identify via a voice communication with a suspected unauthorized user that the suspected unauthorized user pronounces a word differently than the authorized user according to past communications stored in the natural language profile.

As illustrated in blocks 410 and 412, the system collects and assesses content characteristics to generate a content profile component of the user profile. Content characteristics may include a user's knowledge of prior, current, pending, or future interactions or transactions and account related information which may be checked for consistency across all channels. In some embodiments, content characteristics may further include passwords, PIN numbers, answers to security questions, account information, knowledge patterns, cognitive awareness of interaction content, and the like.

As illustrated in blocks 414 and 416, the system collects and assesses interaction characteristics to generate an interaction profile component of the user profile. The interaction characteristics may include information regarding past interactions (e.g., communications) between the user and the entity via the one or more communication channels. In some embodiments, the interaction characteristics may include information regarding account usage or changes. In some embodiments, the interaction characteristics may include timing, duration, contents, requested or performed actions of an interaction. In some embodiments, the interaction characteristics may be collected and assessed across all communication channels in which the user interacts.

The system may analyze the components of the user profile and calculate a weighted confidence function, level, score or the like for each individual component. Confidence level represents a determined reliability or authenticity of the contents of a profile component or an individual communication channel. A reduced confidence level may be related to a determined potential vulnerability in a profile component or communication channel to unauthorized user access. The individual profile components may be individually threat assessed (i.e., risk-rated) depending on potential vulnerabilities of the components determined from historical interaction data and supplemented by streaming interaction data.

Particular communication channels may include inherent vulnerabilities that are accounted for in threat assessment and confidence level calculation for a particular channel. For example, low security communication channels such as IVR may inherently have a lower confidence level and higher risk rating. Alternatively, a video chat channel where the user's picture identity is confirmed (i.e, via facial recognition) may inherently have a high level of confidence assigned to it due to more secure and reliable authentication means. In another example, the system may determine a high confidence level for an interaction executed via a user-preferred communication channel. In yet another example, a user may never have accessed or infrequently accessed a user account via a particular communication channel (e.g., ATM), wherein the less-frequented channel may be assigned a lower confidence level. In some embodiments, an interaction executed via the lower confidence channel may further be flagged for review or require additional authentication due to the lower confidence in the interaction being an authorized interaction.

Confidence scoring and potential threat assessment may further incorporate quality of a data source (i.e., profile component or channel), wherein a higher quality of data may produce a higher confidence level and lower risk-rating. For example, an authorized user may interact with an entity via an electronic AI assistant on a mobile device every day and only have interacted with the entity via a call center once. Due to the wealth of historical interaction data collected over time via the electronic assistant, the system may calculate a higher confidence score for the electronic assistant channel while calculating a lower confidence score for the call center channel. Data quality of a channel may include the communication format of the channel. For example, a video communication may carry a higher confidence level than a text-based communication (e.g., email) due to the level of complexity of the communication, the level of identifying information able to be extracted and analyzed from the communication (e.g., facial recognition), and the difficulty of impersonation by an unauthorized user.

In some embodiments, NLP data acquired via one or more communication channels may be risk-rated wherein data collected during an interaction may be assigned a confidence level based on the determined accuracy or reliability of the data. For example, if a suspected unauthorized user previously communicated via phone, a low confidence score or weighting may be assigned to NLP data from that particular communication channel or from NLP data in general.

In some embodiments, the system may determine that an authorized user does not typically exhibit adequate knowledge of past interactions and give a low confidence weighting to user responses associated with the content profile. For example, the user profile may note that an authorized user regularly forgets the user's password or an answer to a security question. The system may instead rely on a portion of the user profile having a higher confidence level (e.g., the NLP profile component) in order to accurately identify, characterize, and/or authenticate the user.

In some embodiments, confidence levels and threat assessment may further depend on cross-channel consistency of interaction data. In some embodiments, the system determines patterns in interaction data across communication channels, wherein a consistent pattern arising in multiple communication channels may indicate a higher confidence level in the data source of the interaction data.

The process flow is continued in FIG. 4B which provides a high level process flow for interaction optimization, in accordance with one embodiment of the invention. As illustrated in block 418, the process flow continues from block A of FIG. 4A. At block 418, the system checks for data consistency of the previously generated user profile components within each component and across communication channels to confirm an accurate representation of the authorized user in the user profile. If inconsistencies are identified across the profile components and/or communication channels, the process may continue back to block B and onto block 402 of FIG. 4A, wherein the system consolidates inconsistent data and updates confidence levels and threat assessments of profile components and communication channels. Inconsistent data includes interaction data provided by a user that contradicts or is incorrect compared to historical interaction records. For example, inconsistent data may include an incorrectly provided or spelled password, PIN number, account information, or the like. Inconsistent data may further include abnormal user interactions that are dissimilar from the patterns established in the user profile. For example, the system may detect that the user is accessing an account via an unrecognized user device.

In some embodiments, the system may collect additional data in an attempt to more accurately characterize the user within the various components of the user profile and establish an accurate baseline for typical authorized user behavior. In some embodiments, the system may recalculate weighted confidence levels or threat assessments for individual profile components and/or communication channels based on the additional interaction data collected from additional and/or subsequent user interactions in order to reflect the impact of newly incorporated interaction data.

In some embodiments, an inconsistency within a component of the user profile may be identified as a marker, identifying characteristic, or pattern of authorized user activity. For example, the system may determine from a collection of data over time that the authorized user regular forgets or misspells a particular password, answer to a security question, PIN number or the like. In this way, a failure of the authorized user to initially authenticate the authorized user's identity may be an interaction pattern of the authorized user. In response to identifying the inconsistency as a marker of the authorized user, the system updates the user profile and recalculates confidence levels and threat assessments.

In other embodiments, user profile inconsistencies may be indicative of the activity of an unauthorized user, wherein the activity and interactions of the unauthorized user are inconsistent with the activity and interactions of the authorized user. In some embodiments, inconsistent data and an associated user profile may be flagged and forwarded to a resolution team for further review. In other embodiments, user profile inconsistencies may merely indicate that more data needs to be collected and assessed in order to generate a consistent baseline for the authorized user and provide a holistic view of the authorized user and associated interactions. In some embodiments, the system may collect more data for one or more of the user profile components in order to attempt to rectify the inconsistencies.

If no inconsistencies are identified across the user profile components or if profile consistency is determined to be above a predetermined allowable consistency threshold, the process flow may continue to block 420 where the system generates the unified user profile. The unified user profile may include the individual profile components (i.e., channel component, resource usage component, NLP component, content component, and interaction component) merged into a single user profile that provides a holistic view of authorized user activity and interaction history. In some embodiments, confidence levels and threat assessments may be generated and assigned to individual profile components and channels during creation of the unified user profile, as the merged interaction data may be assessed together across all channels to incorporate cross channel consistency.

As illustrated in block 422, the system generates a custom threat assessment map or risk map for the authorized user that defines a series of identified risks and/or vulnerabilities of the authorized user based on the generated unified user profile. A threat assessment map presents overall vulnerability (e.g. low, moderate, high) of a particular authorized user. The custom threat assessment map may include profiles of known unauthorized users and/or known strategies and techniques used by known unauthorized users. In particular, the system may populate the threat assessment map with those unauthorized user profiles and strategies to which the user profile is most vulnerable. The profiles and strategies selected by the system may be based on the user vulnerabilities as determined from the historical interaction data and streaming interaction data of the user profile.

In one example, if an authorized user regularly pays with a credit card at the pump of gas stations, the generated threat assessment map may include credit card skimming devices as a potential vulnerability. In another example, if the authorized user has never interacted via a text message communication channel, the system may flag text message requested password resets as a potential risk-related interaction or vulnerability. In yet another example, if the user reported a lost a credit card, the system may identify unauthorized use of the lost credit card as a potential vulnerability. In other embodiments, the custom risk map may be generated based on personal information associated with the user. For example, if the user is over a particular age, the threat assessment map may include a collection of unauthorized user techniques that routinely target the elderly or account vulnerabilities typically associated with the elderly (e.g., obtaining information by deception, unauthorized use of identify, unauthorized access or control by a caregiver, unauthorized access or control by a relative, etc.).

As illustrated in block 424, the system optimizes subsequent user interactions with the user based on the generated user profile and custom threat assessment map. In some embodiments, interaction optimization may include communication channel optimization, wherein subsequent interaction with the user may be initiated through a user-preferred communication channel instead of an alternative channel that the user does not prefer or with which the user in not proficient. For example, if the user regularly interacts via a phone line communication channel (i.e., a phone call), the system may initiate subsequent interaction primarily via the phone line communication channel when possible. In another embodiment, the system may determine that the user responds more often to communication via a particular communication channel more often than another and primarily use the more responsive channel to communicate with the user. For example, the system may determine that the user only responds to text messages a 10% of the time while responding to emails 95% of the time. Based on this analysis stored within the user profile, the system may interact with the user via email instead of text message.

In some embodiments, interaction optimization may include user action optimization, wherein based on the contents of the user profile, the system may initially present regularly performed actions to the user. In some embodiments, the system may present functionalities of a mobile banking application or website to a user within a graphical user interface (GUI) based on the contents of the user generated profile in order to more efficiently interact with the user. For example, a user may login to a mobile banking application on a mobile device every two weeks to transfer funds between accounts. In response to determining this characteristic pattern of the user, the system may present or feature the fund transfer function within the mobile banking application to the user upon the user login. In another example, the system may identify from the user profile that the user has difficulty remembering a password. In response, the system may automatically prompt the user to instead answer security questions, prompt the user to confirm content characteristics associated with the user's account, and/or identify and authenticate the user via the stored user language profile (i.e., NLP data) instead of providing the password.

In some embodiments, interaction optimization may include security optimization based on the contents of the user profile and the generated threat assessment map. In some embodiments, the system may execute subsequent interactions based on the user profile and threat assessment map in order to reduce the possibility of unauthorized access and prevent use of identified unauthorized user strategies to which the authorized user and associated account may be vulnerable. For example, the user profile may indicate a vulnerability to email-based attempts to obtain information by deception, wherein the system may initiate interactions with the user via phone or voice chat instead of an email communication channel.

In some embodiments, security optimization may include disabling functions of a user account. In one example, the system may disable particular authentication mechanisms that the authorized user regularly fails, wherein the system may automatically prompt the user with a user-preferred authentication mechanism alternative to the disabled mechanism. In another example, the system may identify suspected unauthorized user access, wherein the system may disable one or more account actions (e.g., fund transfers, wire transfers, etc.) until the user may be authenticated via additional authentication mechanisms. In some embodiments, the system may remove account actions or information (e.g. fund transfers, wire transfers, account balance information, user identifying information (e.g., account numbers, passwords, social security number, or the like)) from a GUI of a mobile application in response to identifying suspected unauthorized user access, wherein modules or interactive buttons or links are removed from the typical mobile application GUI until the user provides additional authentication credentials (e.g., biometric authentication, NLP data, calling a service representative, or the like). The system may generate alternative GUIs in real-time in response to suspected unauthorized access.

In some embodiments, the system may be configured to identify irregular account access based on the user profile and the custom threat assessment map, wherein the system is configured to transmit an alert notification to the authorized user based on identifying suspected unauthorized user access or activity. In some embodiments, the alert notification may be transmitted to the user via a user-preferred communication channel not associated with the suspected unauthorized user access or activity. In some embodiments, the system may be configured to preemptively alert the authorized user of potential account vulnerabilities and risks based on the generated user profile and custom map. In some embodiments, the system may inform the user of the vulnerabilities (e.g., unauthorized access strategies) and provide suggestions for increasing account security (e.g., two-step authentication, increase password strength, etc.).

FIG. 5 provides a high level process map for user interaction optimization using a neural network engine, in accordance with one embodiment of the invention. The system leverages deep neural networks, machine learning engines, and/or a collection of artificial intelligence engines to identify and analyze complex user interaction patterns across communication channels and different components of the user profile (e.g., interaction history, user knowledge, NLP) over time in order to accurately and confidently identify an authorized user. The system trains the neural network engines 508 to determine these complex patterns over time by constantly monitoring user interactions as the historical user interaction data 502 and streaming interaction data 504 is constantly updated. The streaming interaction data 504 from subsequent user interactions is continuously incorporated into the unified user profile and the individual profile components. Confidence levels and threat assessments may be recalculated through the continuous process of inputting additional interaction data into the deep learning neural network engine 508.

The system monitors and dynamically updates the user profile components and threat assessment map in real-time based on additional user interactions. In this way, the system may be trained to create a more accurate baseline of the authorized user interactions and identify complex user interaction patterns. By optimizing future interactions based on the user profile, interactions with the user may be made more efficient, wherein interaction time may be reduced and a required amount of computing and/or human resources needed to perform the interaction and associated user actions may be reduced. Furthermore, account security may be increased by identifying unauthorized user access when compared to the baseline of authorized user activity provided by the user profile as well as identified potential vulnerabilities.

As illustrated in FIG. 5, the system extracts historical user interaction data 502, current streaming interaction data 504 from multiple data sources, and unauthorized user profiles from an unauthorized access reference database 506 and leverages neural network learning engines 508 that are trained to identify authorized user behavior using the analyzed user interaction data. The learning engines 508 are further trained to identify applicable vulnerabilities based on the authorized user interaction data (historical and streaming) and known unauthorized access profiles and techniques of the reference database 506. The system may employ this complex analysis to identify occurrences of unauthorized access to a user account by determining abnormal interaction patterns that deviate from the analyzed behavior of the actual user.

By training the neural network engines 508 to confidently identify complex patterns of an authorized user from the interaction data and generating a custom threat assessment map, unauthorized access may be preemptively identified and blocked before losses occur even in cases where complex misappropriation technology is employed by unauthorized users in an attempt to mimic an actual, authorized user (i.e., pass the Turing test). The invention provides a technical solution to the problem of AI-executed account security by utilizing specific-purpose computing devices (e.g., neural networks) in non-conventional, non-obvious ways (i.e., user profile analysis and complex patterning). Furthermore, account security may be increased by identifying unauthorized user access when compared to the baseline of authorized user activity provided by the user profile as well as identified potential vulnerabilities As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with user interaction optimization and account security.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for interaction monitoring and optimization for account security, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for dynamically optimizing channel interactions, the system comprising:
a neural network learning engine; and
a controller configured for analyzing user interactions, the controller comprising at least one memory device with computer-readable program code stored thereon, at least one communication device connected to a network, and at least one processing device, wherein the at least one processing device is configured to execute the computer-readable program code to:
input historical and streaming user interaction data from across a plurality of communication channels into the neural network learning engine, wherein the historical and streaming user interaction data comprises data associated with user interaction with a user interface, authentication actions, account actions, and user communication via the plurality of communication channels;
determine, based on the historical and streaming user interaction data and using the neural network learning engine, one or more neural network-derived user interaction patterns from across the plurality of communication channels, wherein the one or more neural network-derived interaction patterns are associated with authorized user activity; and
build a unified user profile from the one or more neural network-derived user interaction patterns, wherein the unified user profile comprises a channel component, a resource usage component, a natural language processing component, a content component, and an interaction component.

2. The system of claim 1, wherein the at least one processing device is configured to execute the computer-readable program code to continuously update the unified user profile based on subsequent interactions input into the neural network learning engine.

3. The system of claim 1, wherein the at least one processing device is configured to execute the computer-readable program code to calculate confidence levels for the historical and streaming user interaction data from across the plurality of communication channels based on the one or more neural network-derived user interaction patterns, wherein the confidence levels quantify a reliability of the historical and streaming user interaction data and the plurality of communication channels.

4. The system of claim 1, the system further comprising an unauthorized access reference database comprising known unauthorized user profiles and strategies, the at least one processing device being further configured to execute the computer-readable program code to generate a threat assessment map based on the one or more neural network-derived user interaction patterns and the unauthorized access reference database, wherein the threat assessment map defines security vulnerabilities of the unified user profile.

5. The system of claim 4, wherein the at least one processing device is configured to execute the computer-readable program code to input the threat assessment map into the neural network learning engine to determine the neural network-derived user interaction patterns.

6. The system of claim 1, further comprising an unauthorized access reference database comprising unauthorized user profiles, wherein the at least one processing device is further configured to execute the computer-readable program code to:
identify, based on the unauthorized access reference database and using the neural network learning engine, suspected unauthorized user access; and
remove, in response to identifying suspected unauthorized user access, account actions and information from a graphical user interface of a mobile application being accessed by the suspected unauthorized user access.

7. The system of claim 1, wherein the system further comprises a natural language processing module for processing text and voice communications, and wherein the one or more neural network-derived user interaction patterns comprises a communication pattern of the user, the at least one processing device being further configured to execute the computer-readable program code to:
establish a signature marker of the user based on the communication pattern; and
store the signature marker in the unified user profile, wherein the marker is used to at least partially identify and authenticate the user in subsequent interactions.

8. The system of claim 7, wherein the signature marker comprises at least one of vocabulary, word frequency patterns, syntax, grammar, misspellings, abbreviations, pronunciation, intonation, timbre, pitch, cadence, language, and dialect.

9. The system of claim 1, wherein the unified user profile comprises a user knowledge content profile component.

10. The system of claim 1, wherein the at least one processing device is configured to execute the computer-readable program code to:
identify one or more inconsistencies received in the historical and streaming user interaction data based on the one or more neural network-derived user interaction patterns of the unified user profile; and
consolidate the one or more inconsistencies within the unified user profile.

11. The system of claim 10, wherein the one or more inconsistencies comprise a user error or failure to perform an action.

12. The system of claim 10, wherein the one or more inconsistencies are associated with unauthorized user access, and wherein the one or more inconsistencies are consolidated as security vulnerabilities of the unified user profile.

13. A system for dynamic threat assessment across a plurality of communication channels, the system comprising:
a controller configured for analyzing user interactions, the controller comprising at least one memory device with computer-readable program code stored thereon, at least one communication device connected to a network, and at least one processing device, wherein the at least one processing device is configured to execute the computer-readable program code to:

receive historical and streaming user interaction data from across a plurality of data sources, wherein the historical and streaming user interaction data comprises data associated with user interaction with a user interface, authentication actions, account actions, and user communication via the plurality of data sources;

determine one or more user interaction patterns from the historical and streaming user interaction data, wherein the one or more user interaction patterns are associated with authorized user activity;

calculate a confidence level for each of the data sources from across the plurality of data sources based on the one or more user interaction patterns, wherein the confidence level quantifies a reliability of the data sources; and build, based on the confidence level for each of the data sources and based on the one or more user interaction patterns, a unified user profile, wherein the unified user profile comprises a channel component, a resource usage component, a natural language processing component, a content component, and an interaction component.

14. The system of claim 13, the system further comprising a neural network learning engine configured to build and continuously update the unified user profile based on subsequent user interactions, wherein the confidence level is recalculated for each of the plurality of data sources.

15. The system of claim 13, wherein the at least one processing device is configured to execute the computer-readable program code to, when building the unified user profile, merge the historical and streaming user interaction data.

16. The system of claim 15, the system further comprising an unauthorized access reference database comprising known unauthorized user profiles and strategies, the at least one processing device being further configured to execute the computer-readable program code to generate a threat assessment map based on the one or more user interaction patterns and the unauthorized access reference database, wherein the threat assessment map defines security vulnerabilities of the unified user profile.

17. The system of claim 16, wherein the at least one processing device is further configured to execute the computer-readable program code to disable an authentication mechanism or an account action for subsequent interactions based on the security vulnerabilities defined by the threat assessment map.

18. The system of claim 17, wherein the at least one processing device is configured to execute the computer-readable program code to transmit a preventative alert to the user based on the security vulnerabilities defined by the threat assessment map.

19. A computer-implemented method for dynamically optimizing channel interactions, the method comprising:

providing a neural network learning engine; and providing a controller configured for analyzing user interactions, the controller comprising at least one memory device with computer-readable program code stored thereon, at least one communication device connected to a network, and at least one processing device, wherein the at least one processing device is configured to execute the computer-readable program code to:

input historical and streaming user interaction data from across a plurality of communication channels into the neural network learning engine, wherein the historical and streaming user interaction data comprises data associated with user interaction with a user interface, authentication actions, account actions, and user communication via the plurality of communication channels;

determine, based on the historical and streaming user interaction data and using the neural network learning engine, one or more neural network-derived user interaction patterns from across the plurality of communication channels, wherein the one or more neural network-derived interaction patterns are associated with authorized user activity; and build a unified user profile from the one or more neural network-derived user interaction patterns, wherein the unified user profile comprises a channel component, a resource usage component, a natural language processing component, a content component, and an interaction component.

20. The computer-implemented method of claim 19, wherein the at least one processing device is configured to execute the computer-readable program code to continuously update the unified user profile based on subsequent interactions input into the neural network learning engine.

* * * * *